(12) United States Patent
Watson

(10) Patent No.: US 7,883,305 B2
(45) Date of Patent: Feb. 8, 2011

(54) REMOVABLE TWISTLOCK

(75) Inventor: Michael H. Watson, Phil Campbell, AL (US)

(73) Assignee: Fontaine Trailer Company, Inc., Haleyville, AL (US)

(*) Notice: Subject to any disclaimer, the term of this patent is extended or adjusted under 35 U.S.C. 154(b) by 800 days.

(21) Appl. No.: 11/765,139

(22) Filed: Jun. 19, 2007

(65) Prior Publication Data

US 2007/0292228 A1 Dec. 20, 2007

Related U.S. Application Data

(60) Provisional application No. 60/814,712, filed on Jun. 19, 2006.

(51) Int. Cl.
*B60P 7/08* (2006.01)

(52) U.S. Cl. .......................................... 410/82; 410/76
(58) Field of Classification Search .................. 410/68, 410/71, 73, 76, 82, 90, 91, 94; 280/406.1; 248/500, 503, 681
See application file for complete search history.

(56) References Cited

U.S. PATENT DOCUMENTS 5,893,692 A * 4/1999 Asanuma ...................... 410/83
6,491,485 B2 * 12/2002 Zavitz .......................... 410/91

* cited by examiner

*Primary Examiner*—Stephen Gordon
(74) *Attorney, Agent, or Firm*—Ann I. Dennen; J. Mark Bledsoe; Lanier Ford Shaver & Payne P.C.

(57) ABSTRACT

A device for securing a container to a trailer has a base with at least one leg for bolting to the trailer and a twistlock coupled to the base. The twistlock, when actuated, engages an opening in a corner fitting of the container such that the container is securely attached to the trailer.

10 Claims, 4 Drawing Sheets

US 7,883,305 B2

REMOVABLE TWISTLOCK

CROSS REFERENCE

This application claims priority to U.S. Provisional Application No. 60/814,712, entitled "REMOVABLE TWISTLOCK," filed on Jun. 19, 2006, and which is incorporated herein by reference.

FIELD OF THE DISCLOSURE

The present disclosure generally relates to the field of container securement. In particular, the present disclosure relates to a device for securing containers to trailers.

BACKGROUND OF THE DISCLOSURE

It is customary to transport a load on a vehicle, such as a ship, railroad car, or tractor-trailer, in a closed container of standard size and dimension. Typically, these containers are releasably attached to the vehicle by releasable locking mechanisms referred to as "twistlocks." Twistlocks are standardized for engagement with fittings built into one or more corners of the container.

Oftentimes, the floor to which the container is to be affixed is cambered. For example, some trailers are flatbed trailers, and are sometimes cambered in order to bear the heavy loads that are sometimes placed upon them. When a shipping container is placed upon a cambered flatbed trailer, it can be unstable because the bottom of the container does not make contact at every point along the trailer. This instability sometimes leads to unsafe hauling conditions or otherwise causes the cargo inside the container to shift in transit. When cambered flatbed trailers are used to transport shipping containers, they are sometimes modified to prevent uneven distribution, and such modifications can be both expensive and time consuming.

SUMMARY OF THE DISCLOSURE

The present disclosure recognizes and addresses various of the foregoing limitations and drawbacks of the current means of transporting shipping containers with cambered flatbed trailers. Therefore, the present disclosure is directed to a removable twistlock.

It is, therefore, a principle object of the subject disclosure to provide a method of securing shipping containers to cambered flatbed trailers. Still farther, it is an object of the present disclosure to provide a removable twistlock which allows for the securement of shipping containers to cambered flatbed trailers.

Additional objects and advantages of the disclosure are set forth in, or will be apparent to those of ordinary skill in the art from, the detailed description as follows. Also, it should be farther appreciated that modifications and variations to the specifically illustrated and discussed features and materials hereof may be practiced in various embodiments and uses of this disclosure without departing from the spirit and scope thereof, by virtue of present reference thereto. Such variations may include, but are not limited to, substitutions of the equivalent means, features, and materials for those shown or discussed, and the functional or positional reversal of various parts, features, method steps, or the like.

Still further, it is to be understood that different embodiments, as well as different presently preferred embodiments, of this disclosure may include various combinations or configurations of presently disclosed features, elements, method steps, or their equivalents (including combinations of features or configurations thereof not expressly shown in the figures or stated in the detailed description).

These and other features, aspects, and advantages of the present disclosure will become better understood with reference to the following descriptions and the appended claims. The accompanying drawings, which are incorporated in and constitute a part of this specification, illustrate an embodiment of the disclosure, and, together with the descriptions, serve to explain the principles of the disclosure.

DETAILED DESCRIPTION OF THE DISCLOSURE

An exemplary removable twistlock in accordance with the present disclosure is further described herein with reference to FIGS. 1-7. It will be apparent to those skilled in the art that various modifications and variations can be made to the twistlock of the present disclosure without departing from the spirit and scope thereof. For instance, features illustrated or described as part of one embodiment may be used on another embodiment to yield still a further embodiment. Still further, variations and selections of materials and/or characteristics may be practiced to satisfy particular desired user criteria. Thus, it is intended that the present disclosure cover such modifications and variations as come within the scope of the present features and their equivalents.

Figure 1:
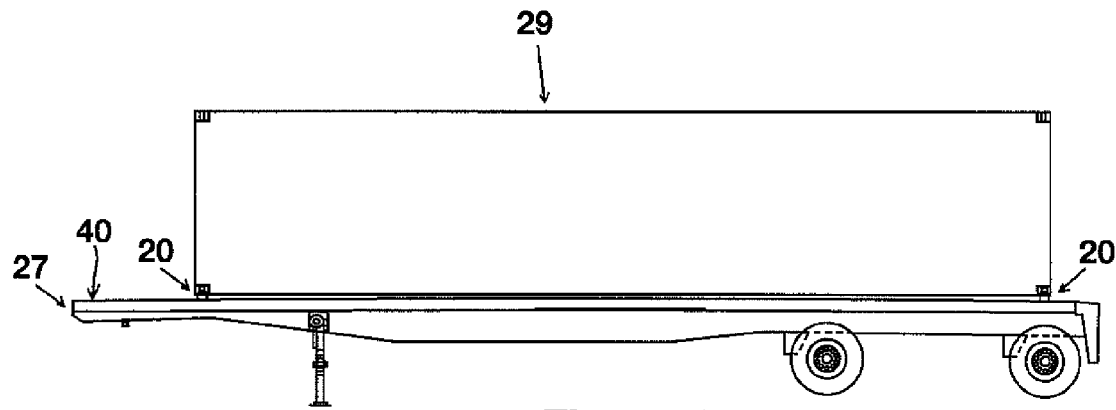
FIG. 1 is side view of a cambered flatbed trailer utilizing an exemplary removable twistlock of the present disclosure to secure a shipping container thereto such that the container sits level on the flatbed.

FIG. 1 depicts a trailer 27 and a container 29 resting on a flatbed 40 of the trailer 27. One or more removable twistlocks 20, in accordance with the present disclosure, couple the container 29 to the flatbed 40 at each corner of the container 29. The removable twistlocks 20 at each corner of the shipping container 29 ensure that the container 29 evenly rests on the flatbed 40 and that the container 29 is secure during transit. In one embodiment, the flatbed 40 is cambered, which refers to a slightly arched surface. Because the flatbed 40 is slightly arched, the container 29 may not necessarily rest evenly on the flatbed 40 without the use of the twistlocks 20.

Figure 2:
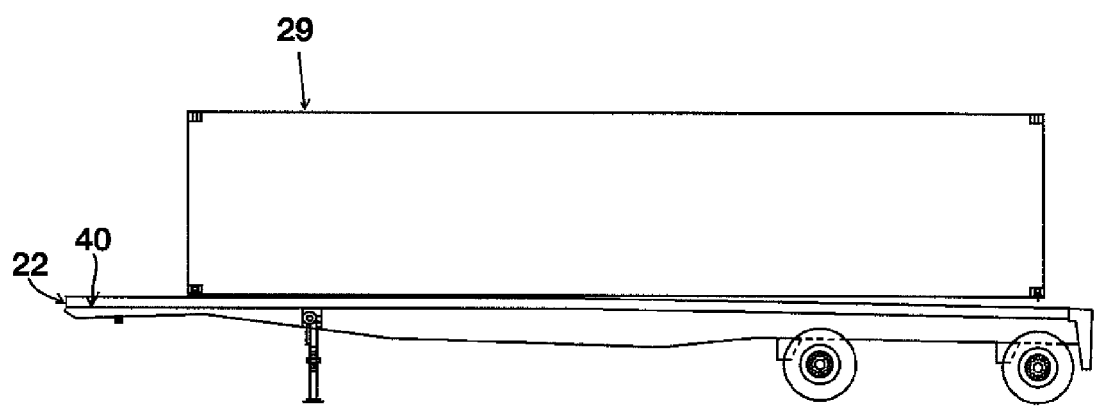
FIG. 2 is side view of a cambered flatbed trailer and a shipping container loaded thereon resting unevenly on the flatbed.

Notably, FIG. 2 depicts the container 29 sitting on the trailer 27 of FIG. 1 without the use of the removable twistlocks 20. As shown in FIG. 2, without the use of the removable twistlocks 20, the container 29 does not rest evenly on the flatbed 40 of the trailer 27 about its entire length, leading to potentially hazardous and unsafe transit conditions.

Figure 3:
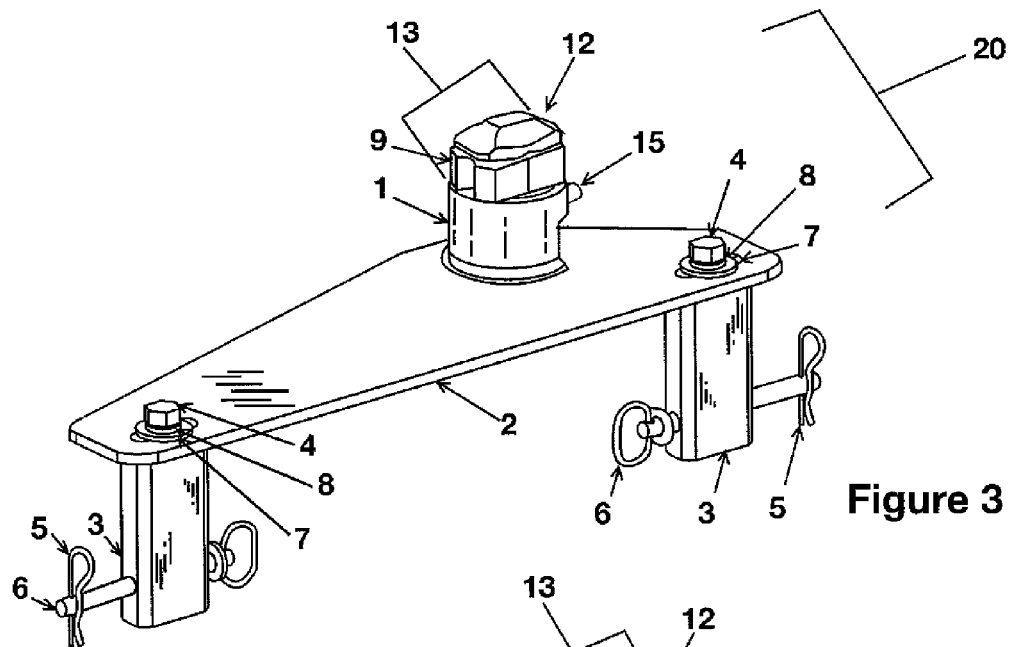
FIG. 3 is a perspective view of the removable twistlock of FIG. 1.

FIG. 3 depicts a perspective view of the twistlock 20 that couples the container 29 (FIG. 1) to the flatbed 40 (FIG. 1). The removable twistlock 20 comprises a base plate 2, a twistlock assembly 13, and one or more legs 3. For purposes of this disclosure, the term "twistlock assembly" is used to describe the locking mechanism which attaches the container to the base plate; however, any lock adapted to secure a container to a trailer may be installed on the base plate in other embodiments.

The twistlock assembly 13 comprises a buffer 9, a lever 15, a lock 12, and a pipe stand 1 upon which the container 29 rests when loaded on a trailer 27. The assembly 13 locks the container 29 in place, described further herein. The pipe stand 1 is immovably secured to the base plate 2. For example, in one embodiment the pipe stand 1 is welded to the base plate 2. Note that the dimensions will vary based upon the weight of the container 29, and varying dimensions are anticipated in varying embodiments of the present disclosure. In this regard, the dimensions are such that when all four corners of the container 29 are supported by the removable twistlock 20 of the present disclosure, the container 29 is level and unaffected by the cambered flatbed 40 of the trailer 27. Discussed further herein with reference to FIG. 5, the base plate 2 is secured to the trailer 29 via two legs 3 which are secured within channels in the trailer's rub rail, described further herein with reference to FIGS. 5 and 7.

In one embodiment, the legs 3 are immovably affixed to the base plate 2. In such an embodiment, the legs 3 are attached to the base plate 2 by a bolt 4, described further herein with reference to FIG. 3. A washer 7, and a lock washer 8, may also be used to secure the legs 3 to the base plate 2. The legs 3 are secured to the trailer 29 with a ring pin hitch 6 which is threaded through an opening in the legs 3 and held in place with a cotterpin 5, described further herein with reference to FIGS. 5 and 7. Other devices may be used to secure the legs 3 to the trailer 29 in other embodiments. As an example, in another embodiment, the legs 3 are welded to the base plate 2.

Figure 4:
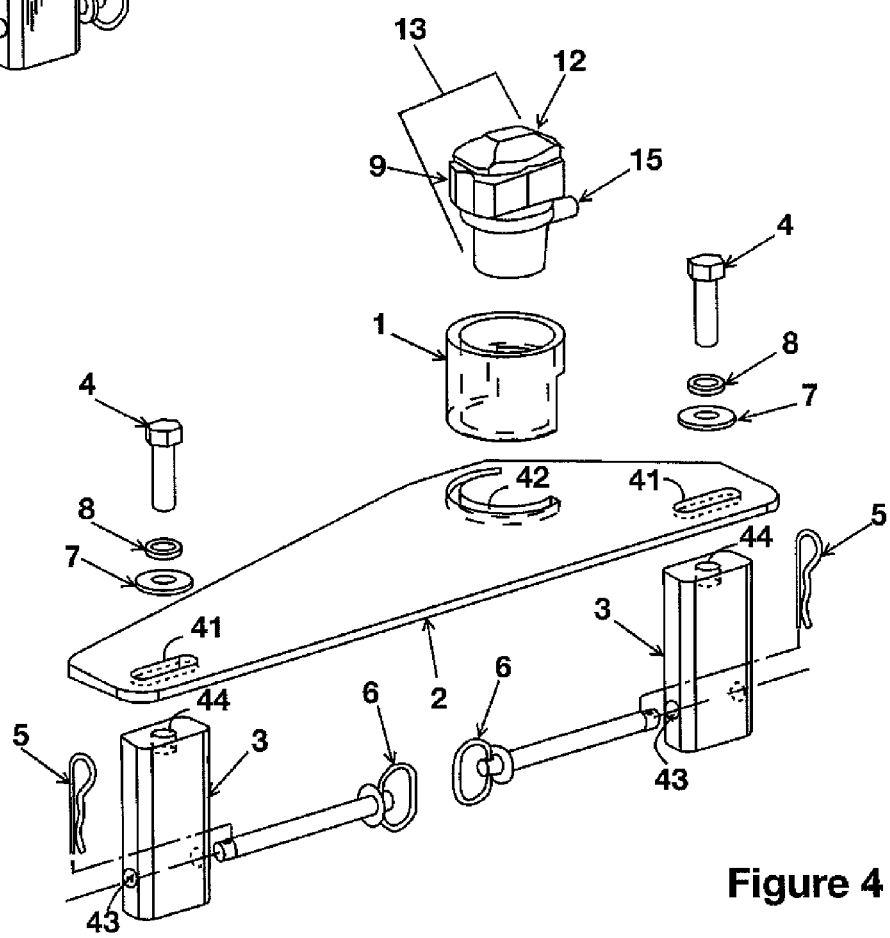
FIG. 4 is an exploded view of the removable twistlock of FIG. 3.
Figure 5:
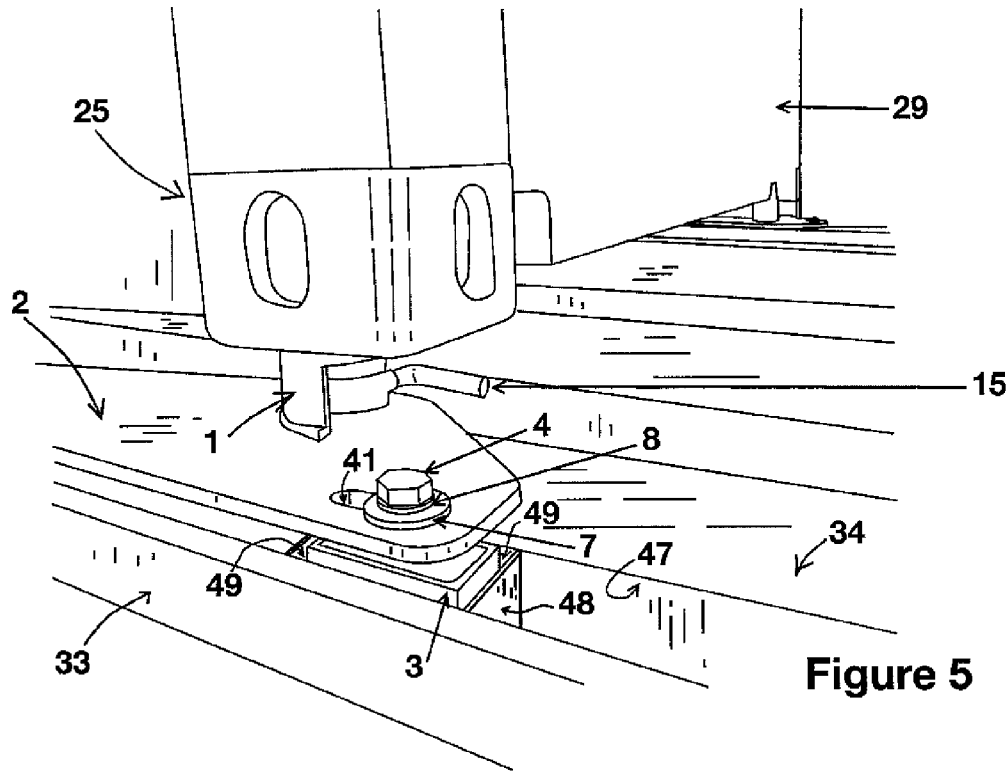
FIG. 5 is a perspective view of the removable twistlock of FIG. 3 with the twistlock assembly in a receiving position.

The twistlock assembly 13 is dimensioned to be inserted into corner fittings of the container, described further herein with reference to FIG. 5. The position of the twistlock assembly 13 relative to the base plate 2, and the orientation of the base plate 2 will depend on which corner of the container 29 it receives. The front left and rear right twistlocks 20 will have the same orientation, whereas the front right and rear left twistlocks 20 will be their mirror images. As shown in FIGS. 4 and 5, in one embodiment the base plate 2 is substantially obtuse triangular shaped with the apex of the triangle closer to the location of the twistlock assembly 13 and pipe stand 1. The twistlock assembly 13 has two positions, one in which to receive the container 29 (the receiving position), and one to lock the container 29 into place on the pipe stand 1 (the locking position).

FIG. 4 depicts an exploded view of the twistlock 20 depicted in FIG. 3. The base plate 2 has at least one elongated groove 41 where the leg 3 is attached to the base plate 2. The elongated groove 41 allows lateral movement of the legs 3 during attachment in order to ensure that variations in sizes of the container 29 or other size differences can be adjusted for when attaching the container 29 to the flatbed 40. Once the legs 3 are positioned according to the size of the container 29, the bolt 4 is placed through the lock washer 8, through the washer 7, and into the opening 44 of the leg 3. Attaching of the twistlock 20 to the trailer 29 is described further herein with reference to FIG. 5.

Furthermore, the pipe stand 1 is inserted into a substantially curved slot 42. The twistlock assembly 13 is inserted within the pipe stand 1, and the twistlock assembly 13 is switched back and forth between the locking position and the receiving position, described hereinabove, by a lever 15. As described, the "receiving position" refers to that position of lock 12, which allows the lock 12 to be inserted into an opening (not shown) of the container 29, described further with reference to FIG. 5. The "locking position" refers to that position of lock 12, which does not allow the twistlock 20 to move with respect to a container 29 to which it is attached.

In this regard, the lever 15 is immovably connected to the lock 12, such that the orientation of the lever 15 determines whether the twistlock assembly 13 is in the receiving position or the locking position. The lock 12 has a substantially cylindrical base which fits within both the buffer 9 and pipe stand 1, and a substantially rectangular head, the orientation of which indicates whether the twistlock assembly 13 is in the receiving or locking position.

The buffer 9 is immovably fixed to the pipe stand 1 and provides clearance for the lock 12 such that the lock 12 may rotate inside the corner fitting of the container 29 thereby locking the container 29 into place, described further herein with reference to FIG. 5. In one embodiment, the pipe stand 1, buffer 9, and lock 12 are concentric, wherein the base of the lock 12 fits within the buffer 9, which fits within the pipe stand 1.

FIG. 5 depicts a perspective view of a corner fitting 25 of the container 29 and its interface with the twistlock 20 of the present disclosure. Note that in one embodiment, the corner fitting 25 is a standard corner fitting, the configuration of which is promulgated by the International Organization for Standardization (ISO standard). Further note that the depiction in FIG. 5 shows the twistlock in the "receiving position," and the receiving position of the twistlock 20 refers to that position of the lock 12 such that the lock 12 can be inserted into an opening (not shown) in the corner fitting 25.

Additionally, FIG. 5 depicts a rub rail 33 of a trailer 29. The rub rail 33 and the floor 34 of the trailer 27 (FIG. 1) forms a channel 47, and the channel 47 has one or more braces 48 forming an opening 49. The leg 3 is inserted in the opening 49 between the braces 48, and the pin hitch 6 is threaded through the opening 43 (FIG. 4) in the portion of the leg 3 which extends beyond the channel 47, described further with reference to FIG. 7. The cotterpin 5 (FIG. 3) is inserted in the pin hitch 6 (FIG. 3), thereby securing the pin hitch 6 to the legs 3 and preventing the legs 3 from traveling vertically through the opening 49 between the braces 48 of the channel 47.

The base plate 2 is bolted to the legs 3, as described hereinabove. Note that the elongated opening 41 allows the bolt 4 to move the length of the opening 41 in order to ensure that the bolt 4 aligns with the opening 44 (FIG. 4) of the leg 3. In this regard, the legs 3 may be placed at varying lengths apart within the limitations allowed by the elongated openings 41.

Figure 6:
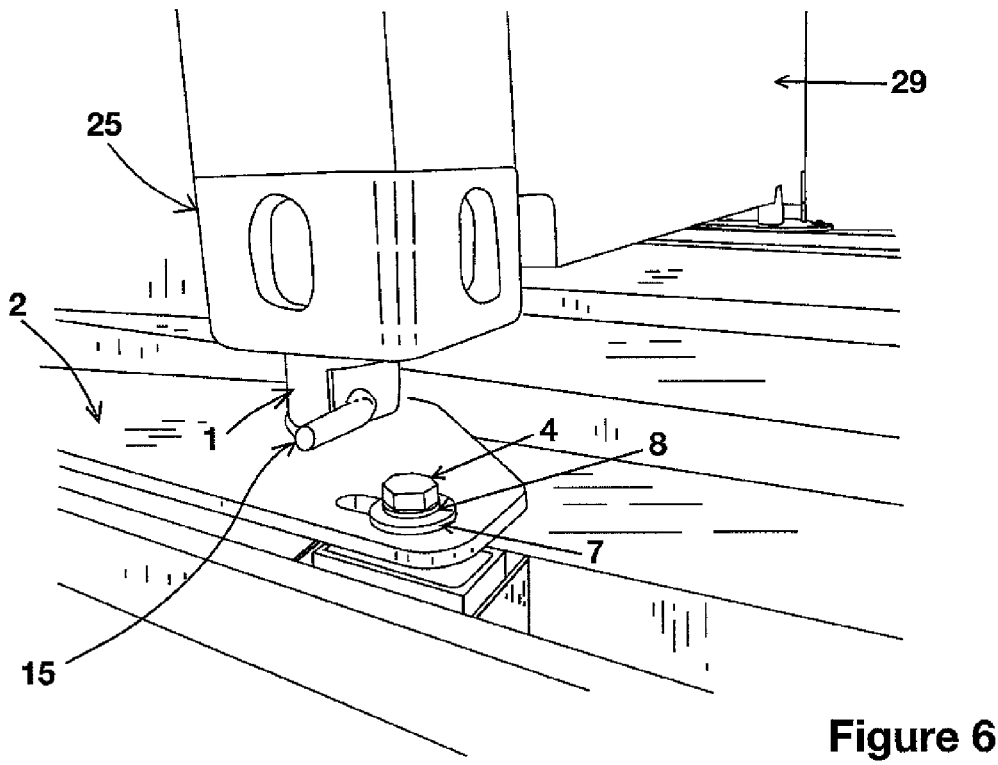
FIG. 6 is a perspective view of the removable twistlock of FIG. 3 with the twistlock assembly in a locking position.

FIG. 6 depicts a perspective view of the corner fitting 25 of the container 29 when the twistlock 20 is actuated thereby securing the container 29 to the trailer 27. Such a position of the twistlock 20 is the "locked position," which refers to that position of the lock 12 such that the lock 12 cannot be removed from the opening in the corner fitting 25.

As described hereinabove, the lever 15 is rotatingly actuated, and when the lever 15 is actuated, the lock 12, which is immovably attached to the lever 15, rotates. When the lock 12 rotates, it securely contacts the opening of the corner fitting 25, and the corner fitting 25 and the lock 12 are immovable with respect to one another. Therefore, the container 29 is immovable with respect to the trailer 27.

Figure 7:
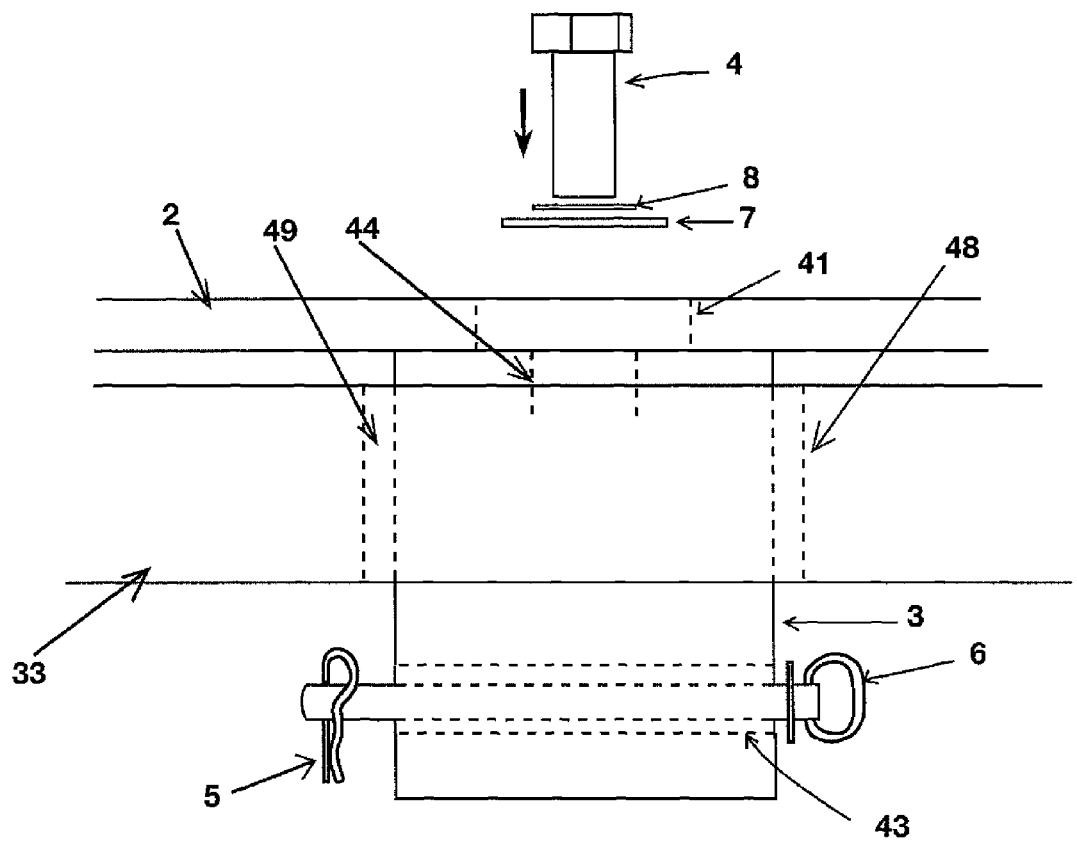
FIG. 7 is a side view of the removable twistlock of FIG. 3 attached to a trailer.

FIG. 7 depicts a side plan view of the attachment of the removable twistlock 20 (FIG. 1) to the trailer 27 (FIG. 1). The bolt 4 is inserted through a lock washer 8 and washer 7, then through the groove 41 of the base plate 2, and the opening 44 of the leg 3. The leg 3 has been inserted through the opening 49 in the rub rail 33 and between the braces 48 of the channel 47 (FIG. 5). The leg 3 is secured with a ring pin hitch 6 which is threaded through the opening 43 in the legs 3. The ring pin hitch 6 is held in place with the cotterpin 5.

Although one embodiment has been described using specific terms and devices, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of various other embodiments may be interchanged both in whole or in part. Therefore, the spirit and scope of the appended claims should not be limited to the description of the preferred version contained herein.

I claim:

1. A device for securing a container to a trailer comprising:
   a. a twistlock assembly having a lever coupled to a rotatable lock;
   b. a base plate
   c. a pipe stand immovably secured to said base plate, said pipe stand having a lateral substantially rectangular slot and an aperture in a top side; and
   d. two legs;
   wherein said twistlock assembly is inserted through said aperture on said top side of said pipe stand such that said lever protrudes from said lateral substantially rectangular slot and said lock protrudes from said aperture, wherein when said lever is actuated, said rotatable lock rotates, and wherein said legs are immovably attached to a bottom side of said base plate.

2. The device of claim 1 wherein said twistlock assembly is immovably connected to a top side of said base plate and receives said container.

3. The device of claim 1 wherein said legs are secured to said base plate by a bolt, and a washer.

4. The device of claim 3 wherein said bolt secures said base plate to a respective one of said legs through an elongated opening in said base plate, wherein said bolt moves along a length of said respective elongated opening, and wherein each respective one of said legs may be placed at varying locations along said base plate within said elongated opening.

5. The device of claim 1 wherein said legs are in the same plane and are secured to said trailer by inserting said legs through corresponding channels of a rub rail on said trailer.

6. A device for securing a container to a trailer comprising:
   a. a lock;
   b. a base plate; and
   c. two legs;
   wherein said lock is immovably attached to a top side of said base plate, and wherein said legs are immovably attached to a bottom side of said base plate, wherein said legs are in the same plane and are secured to said trailer by inserting said legs through corresponding channels of a rub rail on said trailer, and wherein said base plate is secured to said trailer by inserting said legs through said corresponding channels, and inserting a ring pin hitch through a first side of one said legs and attaching a cotterpin to a second side thereof.

7. The device of claim 1 wherein said base plate is substantially triangular shaped.

8. The device of claim 7, wherein said base plate is obtuse triangular shaped having an apex, and wherein the apex of said base plate is located nearest to said twistlock assembly.

9. The device of claim 1, wherein said container has a bottom opening through which the twistlock assembly is inserted such that said lock protrudes into said container and said lever protrudes from said lateral substantially rectangular slot.

10. The device of claim 9, wherein when said lever is actuated said lock rotates such that said lock contacts a floor of said container thereby securing the container to said trailer.

* * * * *